Dec. 19, 1967  C. S. OLSSON  3,359,172
DEVICE FOR OPERATING NEUTRON-ABSORBING
RODS IN NUCLEAR REACTORS
Filed Oct. 8, 1965  3 Sheets-Sheet 2

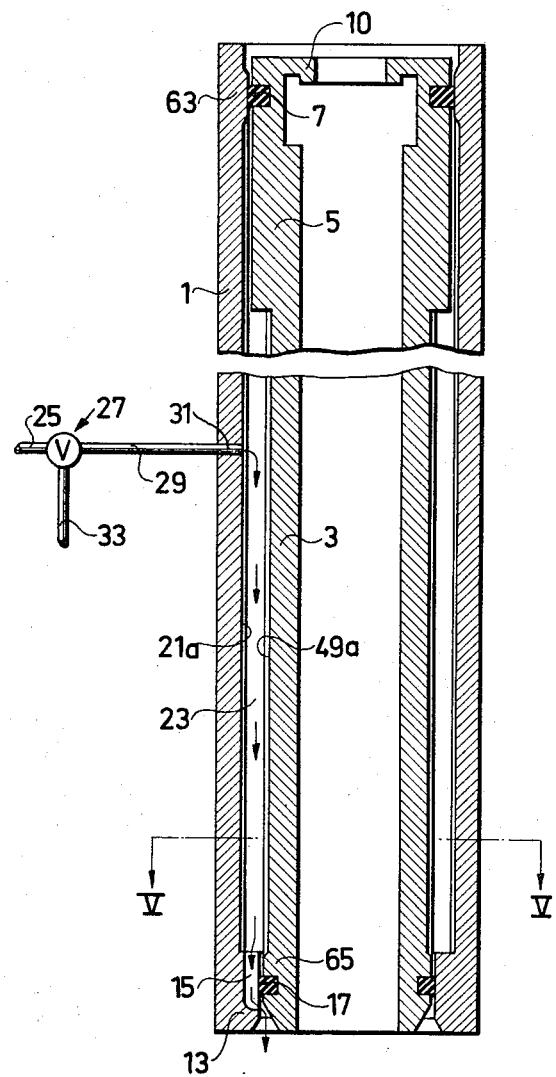
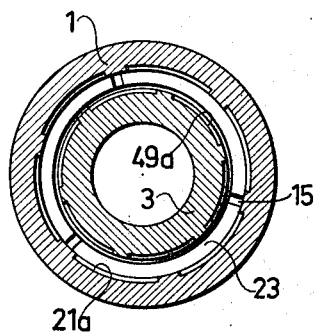

United States Patent Office 3,359,172
Patented Dec. 19, 1967

3,359,172
DEVICE FOR OPERATING NEUTRON-ABSORBING RODS IN NUCLEAR REACTORS
Curt Sigvard Olsson, Bandhagen, Sweden, assignor to Aktiebolaget Atomenergi, Stockholm, Sweden
Filed Oct. 8, 1965, Ser. No. 494,046
Claims priority, application Sweden, Oct. 15, 1964, 12,440/64
5 Claims. (Cl. 176—36)

ABSTRACT OF THE DISCLOSURE

The invention resides in a safety device for a nuclear reactor, in which device a neutron-absorbing rod is suspended by hydraulic means above the reactor core, but may be inserted into the core by release of hydraulic pressure. A retracting mechanism cooperates with the safety device to lift the latter out of the reactor core.

The invention relates to a device for operating neutron-absorbing rods in nuclear reactors.

It is the task of such neutron-absorbing rods to produce a rapid shut-off of the reactor, for instance when a fault occurs which might jeopardize the safe operation of the reactor. Consequently, the means for operating the neutron-absorbing rods must work with a high reliability. It is desired that the safety device, that is the neutron-absorbing rods and the means for operating them, shall contain as few moving parts as possible.

It is an object of the invention to provide a simple and reliable device for the operation of neutron-absorbing rods in nuclear reactors. It is another object of the invention to provide a device containing one moving part only, which is brought to fall by its own weight into the reactor core upon a signal that the reactor shall be shut off. Said objects are attained, according to the invention, by a device comprising a substantially vertical cylinder above the reactor core, a slide member which is axially movable in the cylinder and which supports a substantially vertical absorbing rod and which has a plunger at its upper end, and means for supplying a pressurized fluid to the space defined by the cylinder, the slide member and the plunger, for holding the slide member in its upper position, in which the absorbing rod is situated above the reactor core. The device is characterized in that the cylinder and/or the slide member has recessed portions along its entire operative length, said recessed portions forming channels through which the pressurized fluid can leave the space when the slide member leaves its upper position after the supply of pressurized fluid has been cut off, to the effect that the absorbing rod can fall down into the reactor core by its own weight and relatively freely. The absorbing rod and the slide may be separate parts, the absorbing rod being connected to and carried by the slide. In a preferred embodiment the slide is the absorbing rod, that is, the slide consists of a neutron-absorbing material, such as a boron-containing steel. The recessed portions may be circular or may consist of longitudinal grooves.

Figure 1:
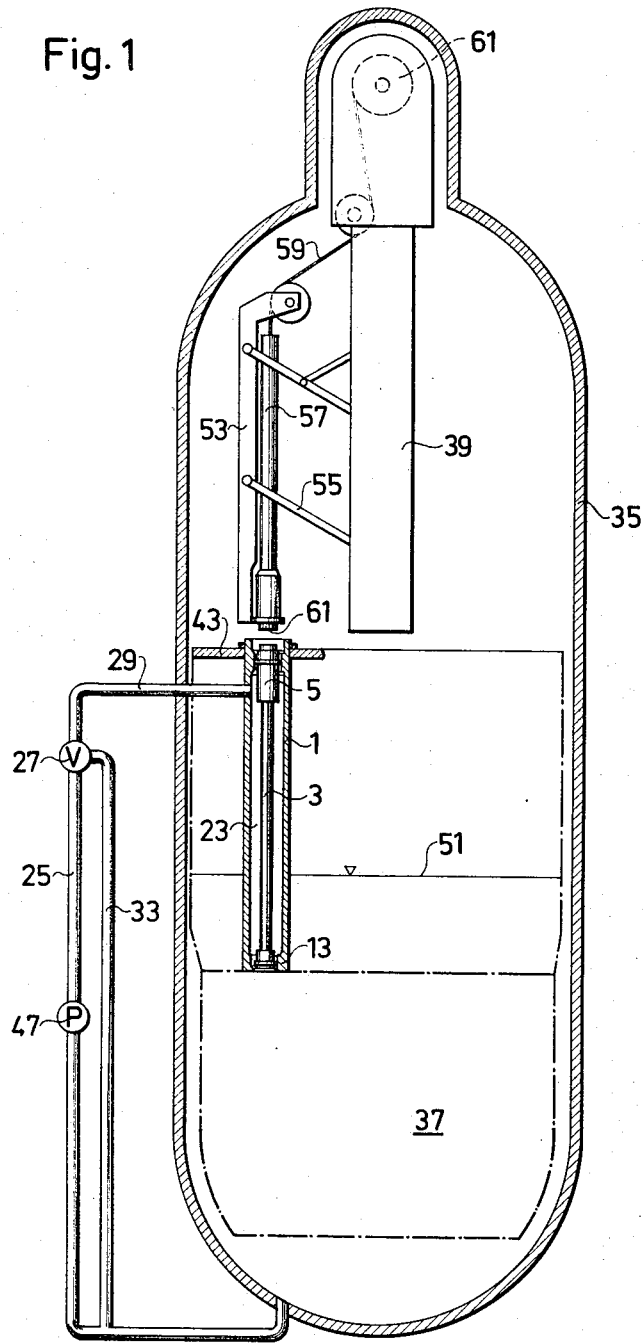
Figure 2:
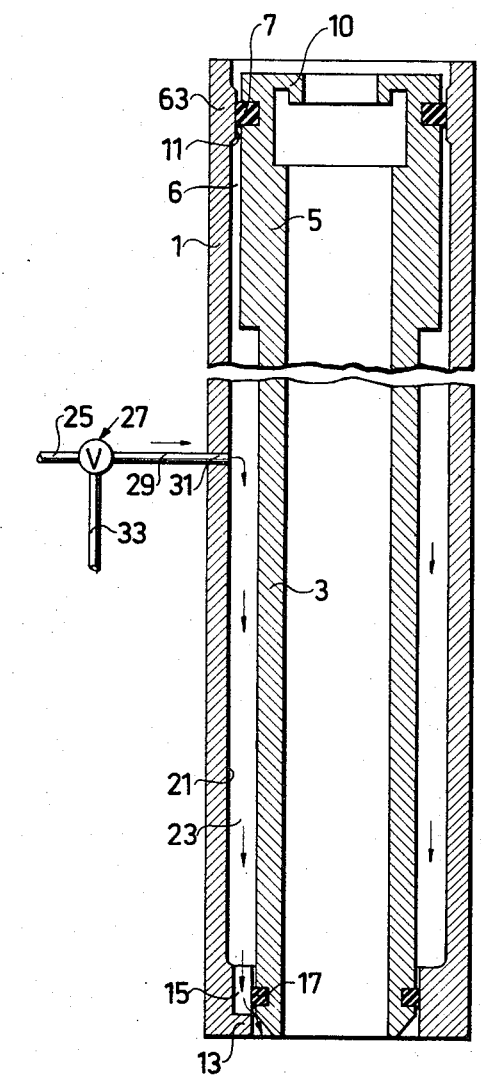
Figure 3:
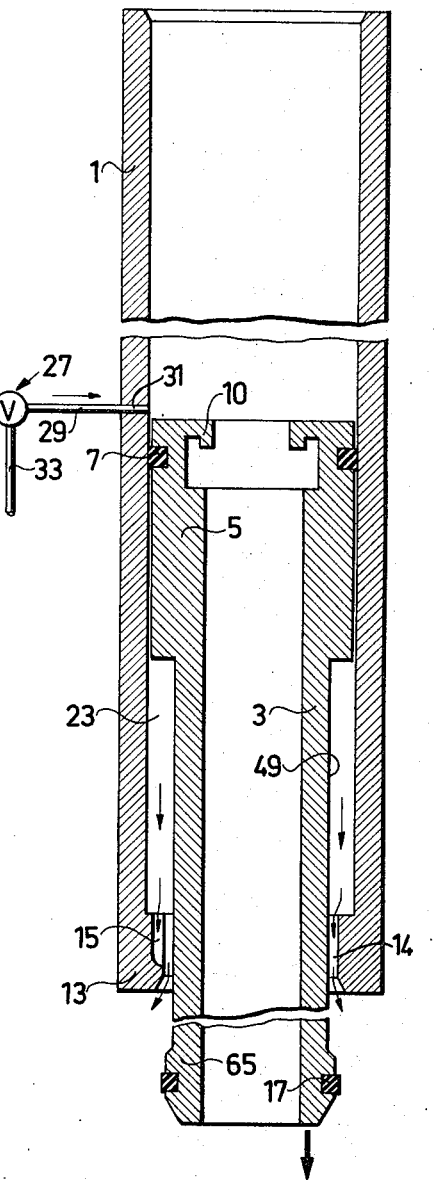

The invention will now be described with reference to the embodiments illustrated on the accompanying drawings. FIG. 1 shows a nuclear reactor containing a safety device according to the invention. FIGS. 2–4 show on a larger scale three embodiments of the safety device in the reactor of FIG. 1. FIG. 5 shows a cross-section on line V—V of FIG. 4. The same reference characters have been used for similar parts in the figures.

FIG. 1 discloses a water-cooled nuclear reactor containing a safety device according to the invention. The reactor comprises a reactor tank 35 containing the nuclear fuel in a core 37, a handling machine 39, which is the machine used for removing used fuel from and inserting new fuel into the reactor, and between the core 37 and the handling machine 39 a safety device according to the invention. For the sake of clarity only one safety device is illustrated. The safety device comprises a cylinder 1, open in both ends and having its upper end fastened to a partition 43 and its lower end connected to the upper side of the reactor core 37. The lower portion of the safety device is situated below the water level 51 in the reactor tank.

The cylinder 1 contains a slide member consisting of a neutron-absorbing rod 3 having a plunger-like upper portion 5. The rod 3 can be held in the position shown in FIG. 1 by a hydraulic pressure being maintained in the space 23 between the cylinder 1 and the rod 3. The hydraulic pressure is created by a pump 47 which is situated in a conduit 25, 29 having its lower end connected to the bottom of the reactor tank. The conduit 25, 29 contains a three-way magnetic valve 27. The space 23 can be connected to the bottom of the reactor tank via a by-pass conduit 33 having its upper end connected to the valve 27. This valve 27 is operated magnetically from a place remote from the reactor. If desired it can be arranged for an automatic operation, for instance to be switched over when the neutron flux from the reactor exceeds a predetermined value.

The handling apparatus comprises a central stem 39 which can be turned in any direction. Arms 55 carry a vertical member 53 which supports a telescopic lifting member 57 which can be raised and lowered by means of a wire 59. The wire 59 is operated by a drum 61. The lifting member 57 carries a grip member 61 which can be lowered through the entire length of the cylinder 1 to lift the rod 3, as will be more clearly described below. According to FIG. 2 the top portion of the slide member 3 is widened to form a plunger 5 containing a seal ring 7 provided in an annular groove in the plunger. The top of the tubular slide member has an internal flange 10 by means of which the slide member can be seized by the grip member 61 to be lifted by the lifting member 57. When the slide member 3 is in the illustrated position the seal ring 7 engages a seal surface 11 formed by an annular thickened portion 63 of the cylinder wall 1.

Along its entire operative length the inner wall of the cylinder 1 has an annular portion 21 which is recessed in relation to the upper seal surface 11. Said recessed portion 21 forms an annular space 6 between the cylinder 1 and the plunger 5.

The bottom end of the cylinder 1 has an internal annular flange or shoulder 13 tightly surrounding the slide member 3. The flange 13 contains three axially extending grooves 15, situated on the inner surface of the flange at an angular distance of 120°. The grooves 15 do not extend down to the lower surface of the flange, for a reason to be described below. The lower portion of the slide member carries a seal ring 17. When the slide member 3 is in its illustrated upper position in the cylinder 1, the seal ring 17 registers with the flange 13.

The device of FIG. 2 operates as follows. The pressurized water supplied through the conduit 29 produces in space 23 a pressure which is higher than the reactor pressure and which is defined by the quantity of water supplied per unit of time and by the flow resistance in the channels between the seal ring 17 and the grooves 15 in the lower portion of the device. Water steadily flows from the space 23 through the channels 15. A decreased supply of pressurized water to the space 23 will result in a small downward movement of the rod 3, producing a restriction of the area of the flow channels. An increased supply of pressurized water to the space 23 results in a small upward movement of rod 3 in the cylinder. Consequently, the flow area of the channels 15 will increase to correspond to the increased supply of water. Consequently, the rod 3 will be dynamically balanced, allowing the rod to stay in its upper position even if the supply of pressurized water is varied within wide limits.

If it is desired to decrease the reactivity of the reactor, for instance for rapidly shutting off the reactor, the supply of pressurized water to space 23 is closed by the magnetic valve 27 being switched over to connect conduit 29 with conduit 33, resulting in space 23 being connected to the bottom of the reactor tank. The pressure in space 23 consequently decreases down to the reactor pressure. The rod 3 begins to move downwards by its own weight. As soon as the seal ring 7 has come out of engagement with the seal surface 11 the rod 3 can move much faster, owing to the fact that the water in space 23 will now flow upward through the annular space 6 between the piston 5 and the wall of the cylinder 1. The downward movement of the rod is limited by the lower surface of the plunger 5 coming into contact with the flange 13 on the lower portion of the cylinder 1. The movement of the rod can be retarded at its lower position by a spring (not shown) provided around the rod to be compressed between the plunger 5 and the flange 13.

When the reactor is again to be set into operation the grip member 61 of the handling apparatus 39 is lowered into the cylinder 1 to engage the flange 10 at the top of the rod, and the rod 3 is now lifted to its upper position. Now the magnetic valve 27 is switched over to supply pressurized water to the space 23, and finally the grip member 61 is released from the rod 3.

FIG. 3 discloses another embodiment of the invention. The cylinder 1 has no recessed portion, but the rod 3 has on its outer wall an annular recessed portion 49. This recessed portion 49 terminates at some distance from the lower end of the rod 3, resulting in a thickened wall portion 65 in the bottom of rod 3, this thickened wall portion containing the seal ring 17. The inner wall of the cylinder 1 has a constant diameter, disregarding the flange 13 at the lower end.

The device operates in the same way as the device of FIG. 2, but for the difference that, when the rod 3 has fallen so far that the seal ring 17 disengages the flange 13, the pressurized fluid flows from the space 23 through the annular space 14 defined between the flange 13 and the narrowest portion of the rod 3. The upper seal ring 7 continuously engages the inner wall of the cylinder 1.

FIGS. 4 and 5 disclose another embodiment, which can be said to be a combination of the embodiments of FIGS. 2 and 3 in that there are recessed portions both on the inner wall of the cylinder 1 and on the outer wall of the rod 3. However, these recessed portions are not annular as in the embodiments described above, but have the shape of longitudinal grooves, namely six grooves 21a in the wall of the cylinder 1 and six grooves 49a in the wall of the rod 3. When the rod 3 is falling down the water flows from the space 23 through the six spaces 21a between the plunger 5 and the cylinder wall, and through the six spaces 49a between the rod 3 and the flange 13.

In the devices described above the absorbing rod can fall relatively freely when the supply of pressurized water has been cut off, and when the rod has moved downward a distance sufficient for the seal rings to disengage the seal surfaces, because of the fact that the water in the space 23 flows through the channels defined by the recessed portion in the cylinder and/or the rod. The safety device contains one moving part only, viz. the rod, and is, therefore, very reliable in operation.

What is claimed is:
1. In a nuclear reactor comprising a core containing fissile nuclear fuel, a substantially vertical cylinder above the reactor core, a substantially vertical neutron-absorbing slide member which is axially movable in the cylinder and which comprises a neutron-absorbing rod having a plunger at its upper end, and means for supplying a pressurized fluid to a space defined by the cylinder and the cooperating slide member including said plunger for holding the slide member in its upper position in which the absorbing rod is situated above the reactor core, the improvement wherein recessed portions are provided in one of said cooperating parts consisting of the cylinder and the slide member, said recessed portions extending along the entire operative length of said part, said recessed portions forming channels through which fluid leaves said space when the slide member leaves its upper position after the supply of pressurized fluid has been cut off, to the effect that the slide member falls into the reactor core by its own weight and relatively freely, and wherein lifting means are provided to be detachably fastened to the upper end of said slide member and to lift said slide member so that the slide member is removed from the core and the slide member is elevated to its upper position in said cylinder.

2. A device as claimed in claim 1, wherein the recessed portions consist of longitudinal grooves.

3. A nuclear reactor, comprising a reactor tank, nuclear fuel in a core in the lower portion of the reactor tank, at least one safety device in the middle portion of the reactor tank, above said core, said safety device comprising a vertical cylinder, a substantially vertical neutron-absorbing slide member which is axially movable in said cylinder, said slide member comprising a neutron-absorbing rod having a plunger at its upper end, the interacting surfaces of the cylinder and the slide member a first portion creating a substantially closed chamber between the cylinder and the slide member when the slide member is in its upper, inoperative position in which said neutron-absorbing rod is above and outside of said core, and a second portion creating a substantially open chamber between the cylinder and the slide member when the slide member is in a position lower than said upper, inoperative position, means for supplying pressurized liquid into said substantially closed chamber for holding the slide member in said upper, inoperative position, means for shutting off the supply of pressurized liquid to said substantially closed chamber thereby releasing the slide member to move downward from said upper, inoperative position and to fall by its own weight through said cylinder so as to reach its lower, operative position in which the neutron-absorbing rod is situated within the reactor core, and a handling machine in the upper portion of the reactor tank, above said safety device, said handling machine comprising a lifting member and means for lowering said lifting member into the cylinder of the safety device, for gripping the slide member, and for lifting it from the lower, operative position to the upper, inoperative position.

4. A water-cooled nuclear reactor as claimed in claim 3, in which said liquid is the cooling water, comprising a conduit for passing water from the lower portion of the reactor tank to the cylinder of the safety device, a pump in said conduit for creating a pressure sufficient for holding the slide in its upper, inoperative position, and a by-pass conduit for allowing water to pass between the lower portion of the reactor tank and the cylinder of the safety device, past said pump and valve means for opening said conduit while closing said by-pass conduit and vice versa.

5. A water-cooled nuclear reactor as claimed in claim 4, in which said by-pass conduit is connected to said conduit by means of a magnetically operated three-way valve.

References Cited

UNITED STATES PATENTS

| | | | |
|---|---|---|---|
| 2,975,119 | 3/1961 | Emmons | 176—36 |
| 2,990,356 | 6/1961 | Chapellier et al. | 176—36 |
| 3,088,901 | 5/1963 | Gustafsson et al. | 176—36 |
| 3,154,472 | 10/1964 | Shannon | 176—36 |
| 3,212,981 | 10/1965 | Tollet et al. | 176—36 |
| 3,235,464 | 2/1966 | Ashcroft | 176—36 |

L. DEWAYNE RUTLEDGE, *Primary Examiner.*

CARL D. QUARFORTH, *Examiner.*

H. E. BEHREND, *Assistant Examiner.*